United States Patent [19]
Schütze et al.

[11] Patent Number: 5,747,582
[45] Date of Patent: May 5, 1998

[54] AQUEOUS COATING COMPOSITIONS AND THEIR USE FOR THE PREPARATION OF COATINGS THAT ARE PERMEABLE TO WATER VAPOR

[75] Inventors: Detlef-Ingo Schütze, Köln; Wilhelm Thoma, Leverkusen; Klaus Nachtkamp, Düsseldorf; Josef Pedain, Köln; Reinold Schmitz, Odenthal, all of Germany

[73] Assignee: Bayer Aktiengesellschaft, Leverkusen, Germany

[21] Appl. No.: 460,178

[22] Filed: Jun. 2, 1995

Related U.S. Application Data

[63] Continuation-in-part of Ser. No. 294,215, Aug. 22, 1994, abandoned, which is a continuation-in-part of Ser. No. 139,385, Oct. 19, 1993, abandoned.

[30] Foreign Application Priority Data

Oct. 29, 1992 [DE] Germany ............... 42 36 569.4

[51] Int. Cl.$^6$ .............. C08J 3/00; C08K 3/20; C08L 75/00
[52] U.S. Cl. ............ 524/591; 524/539; 524/839; 524/840
[58] Field of Search ................. 524/591, 839, 524/840, 539

[56] References Cited

U.S. PATENT DOCUMENTS

| | | | |
|---|---|---|---|
| 4,092,286 | 5/1978 | Noll et al. | 260/29.2 TN |
| 4,108,814 | 8/1978 | Reiff et al. | 260/29.2 TN |
| 4,237,264 | 12/1980 | Noll et al. | 528/67 |
| 4,238,378 | 12/1980 | Markusch et al. | 260/29.2 TN |
| 4,276,044 | 6/1981 | Dieterich | 8/115.5 |
| 4,293,474 | 10/1981 | Dieterich et al. | 260/29.2 TN |
| 4,303,774 | 12/1981 | Nachtkamp et al. | 528/71 |

FOREIGN PATENT DOCUMENTS 0000347 1/1979 European Pat. Off. .
1510953 5/1978 United Kingdom .

*Primary Examiner*—Patrick D. Niland
*Attorney, Agent, or Firm*—Joseph C. Gil; Richard E. L. Henderson

[57] ABSTRACT

The invention relates to coating compositions used to prepare coatings having water vapor permeabilities of at least 2500 g/m$^2$ per day (DS 2109 TM1 method) containing (A) a polyurethane containing (1) 0.1 to 75 meq/100 g of ionic groups and (2) 11 to 50% by weight of —(CH$_2$CH$_2$O)$_n$— units (wherein n is 2 to 25) incorporated into the main chain prepared from reactive components comprising (I) one or more polyisocyanates,
(II) one or more polyols having a number average molecular weight of 350 to 5000, with the proviso that if any such polyol is a sulfonated polyether diol having the formula

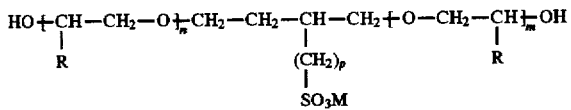

in which R is hydrogen or an organic group having 1 to 8 carbon atoms, m and n are 1 to 10, p is 0, 1, or 2, and M is ammonium or alkali metal cation, then an additional ethoxy-containing polyether polyol must also be present, and (III) one or more chain lengthening agents having a molecular weight of 32 to 349; and (B) 30 to 80% by weight, based on the sum of components (A) and (B), of an aqueous phase.

9 Claims, No Drawings

AQUEOUS COATING COMPOSITIONS AND THEIR USE FOR THE PREPARATION OF COATINGS THAT ARE PERMEABLE TO WATER VAPOR

This application is a Continuation-In-Part of application Ser. No. 08/294,215 filed on Aug. 22, 1994, which is a Continuation-In-Part of application Ser. No. 08/139,385 filed on Oct. 19, 1993, both abandoned.

BACKGROUND OF THE INVENTION

The invention relates to the coating of substrates, in particular flexible substrates such as textile sheets, with agents obtained from (A) polyurethanes containing hydrophilic groups and (B) an aqueous phase. The invention further relates to the use of these agents for the preparation of coatings which are permeable to water vapor. The term "polyurethanes" as used in this invention includes polyurethane ureas.

Coatings that are highly permeable to water vapor have in the past repeatedly been the object of investigations and developments for which they are particularly suitable, for example, for the manufacture of high quality leather substitutes or for the production of garments having high wearing comfort.

Because immersion bath and evaporation coagulation, incorporation, and subsequent washing out of water-soluble salts, as well as perforation by means of high energy electron beams, produce micro-channels or microcavities in the coating and thereby weaken the coating, it is of particular interest to obtain coatings that are permeable to water vapor but which are free from pores.

Most polyurethanes used for coating compositions are dissolved or dispersed in organic solvents but the trend toward using coating compositions containing little or no solvent favors the use of aqueous coating systems. Polyurethanes that are self-emulsifiable due to the presence of hydrophilic groups and that can therefore be dispersed in water without the aid of external emulsifiers are known. See German Patentschriften 2,446,440, 2,551,094, 2,651,505, 2,651,506, and 2,659,617 and German Offenlegungsschrift 2,816,815 (as well as the respective counterpart U.S. Pat. Nos. 4,108,814, 4,092,286, 4,238,378, 4,237,264, 4,293,617, and 4,303,774); compare British Patent 1,510,953 (leather primer to enhance adherence of subsequent dressing layers). An optimum combination of dispersibility of the polyurethane in water with high permeability to water vapor and sufficient water resistance of the coatings, such as required for coating compositions used for the preparation of water vapor permeable coatings, has, however, not been available until now.

It has now surprisingly been found that coatings that are highly permeable to water vapor and have very little tendency to swell in water can be prepared by using, as coating compositions, systems containing (A) polyurethanes that contain ionic groups and polyethylene oxide units having defined quantity and sequence length and (B) an aqueous phase.

SUMMARY OF THE INVENTION

The present invention thus relates to coating compositions used for the preparation of coatings having a water vapor permeability of at least 2500 g/m$^2$ per day (preferably at least 3000 g/m$^2$ per day, most preferably from 3600 to 25,000 g/m$^2$ per day) using the DS 2109 TM1 method comprising (A) a polyurethane containing (1) from 0.1 to 75 meq (preferably from 0.5 to 40 meq) per 100 g of polyurethane (A) of ionic groups preferably selected from the group consisting of (a) alkali metal and ammonium salts of carboxylate groups, (b) alkali metal and ammonium salts of sulfonate groups, (c) ammonium groups, and (d) mixtures thereof, and (2) 6 to 50% by weight (preferably 10 to 40% by weight and more preferably from 10 to 35% by weight), based on polyurethane (A), of polyethylene oxide —(CH$_2$CH$_2$O)$_n$— units having a sequence length n of from 2 to 50 (preferably from 2 to 25 and more preferably from 3 to 12) incorporated into the main chain, wherein said polyurethane (A) is prepared from reactive components comprising (I) one or more polyisocyanates, (II) one or more polyols (preferably diols) having an average molecular weight of from 350 to 5000 (preferably from 800 to 2500), with the proviso that if any such polyol is a sulfonated polyether diol having the formula

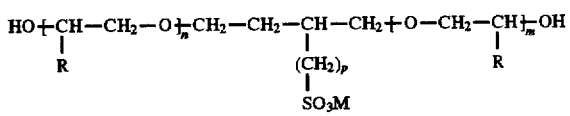

wherein R denotes hydrogen or an organic group having 1 to 8 carbon atoms, m and n independently represent the numbers 1 to 10, p represents 0, 1, or 2, and M denotes ammonium or the cation of an alkali metal, then at least one additional polyether polyol containing ethoxy groups must also be present, preferably in quantities such that at least 25% (more preferably at least 50%) of the ethoxy groups incorporated into the main chain of polyurethane (A) are derived from said additional polyol, and (III) one or more chain lengthening agents having a molecular weight of from 32 to 349; and (B) from 30 to 80% by weight, based on the sum of components (A) and (B), of an aqueous phase.

DETAILED DESCRIPTION OF THE INVENTION

The term "incorporated into the main chain" as used in the context of this invention means that the polyethylene oxide units do not form the end of a chain but are attached at both ends to radicals each of which contains at least one urethane or urea group. "Incorporated into the main chain" is thus contrasted to the conventional concept of "terminally positioned" or "laterally positioned". Cf., European Patent Application 347 (page 9).

The effect achievable with the coating compositions according to the invention is very surprising because polyurethanes which contain either the ionic groups alone or the polyethylene oxide units of the type defined in the claims alone do not, for practical purposes, have any permeability to water vapor.

The polyurethanes described in German Patentschriften 2,551,094, 2,651,505, 2,651,506, and 2,659,617 and in German Offenlegungsschrift 2,816,815 contain polyethylene oxide units in terminal positions and/or lateral positions and thus do not satisfy the requirements according to the present invention.

In the polyurethanes described in German Patentschrift 2,446,440 (counterpart of U.S. Pat. No. 4,108,814), sulfonated diol units that may also contain alkylene oxide units of unspecified sequence length are incorporated into the main polymer chain in such a quantity that the polyurethanes have a sulfonate group content of 0.1 to 6% by weight. However, only propoxylated or ether group-free sulfonated diols are used in the examples. Hydroxyl compounds other than sulfonated diols are described as suitable for incorporation into such polyurethanes, but only polyester diols are used in the examples. Polyether polyols free from sulfonate groups are not used. German Patentschrift 2,446,440, therefore, does not suggest that improved coating compositions would be obtained by incorporating both ionic groups and polyethylene oxide units having sequence lengths of from 2 to 50 into a polyurethane in the specified quantity of 6 to 50% by weight. In addition, the German patent does not mention water vapor permeable coatings and thus could not suggest using polyurethane dispersions for the preparation of water vapor permeable coatings.

For the preparation of coatings that are permeable to water vapor, it was necessary to overcome a preconception insofar as one skilled in the art would regard it as highly probable that coatings based on polyurethanes that contain not only ionic groups but in addition other hydrophilic groups (such as polyethylene oxide units) would not provide sufficient wet resistance. Even with hindsight it still appears extremely surprising that dispersibility of the polyurethanes in water and high permeability to water vapor could be combined with good wet strength of the resulting coatings.

The polyurethanes (A) may be prepared in known manner, either solvent-free or, preferably, in an organic solvent.

Polyurethanes (A) are prepared from polyisocyanates of the formula $Q(NCO)_2$ in which Q stands for an aliphatic hydrocarbon group having 4 to 12 carbon atoms, a cycloaliphatic hydrocarbon group having 6 to 25 carbon atoms, an aromatic hydrocarbon group having 6 to 15 carbon atoms, or an araliphatic hydrocarbon group having 7 to 15 carbon atoms. Examples of such preferred diisocyanates include tetramethylene diisocyanate, hexamethylene diisocyanate, dodecamethylene diisocyanate, 1,4-diisocyanatocyclohexane, 3-isocyanatomethyl-3,3,5-trimethylcyclohexylisocyanate (isophorone diisocyanate), 4,4'-diisocyanatodicyclohexylmethane, 4,4'-diisocyanato-3,3'-dimethyldicyclohexylmethane, 4,4'-diisocyanatodicyclohexylpropane-(2,2), 1,4-diisocyanatobenzene, 2,4- or 2,6-diisocyanatotoluene or mixtures of these isomers, 4,4'-, 2,4'- or 2,2'-diisocyanatodiphenylmethane or mixtures of these isomers, 4,4'-diisocyanatodiphenylpropane-(2,2), p-xylylene diisocyanate and $\alpha,\alpha,\alpha',\alpha'$-tetramethyl-m- or -p-xylylene diisocyanate, and mixtures of these compounds.

The higher functional polyisocyanates known from polyurethane chemistry and known modified polyisocyanates, such as polyisocyanates containing carbodiimide groups, allophanate groups, isocyanurate groups, urethane groups, and/or biuret groups, may, of course, also be used as all or part of the polyisocyanate component.

The reactants used for the polyisocyanates are mainly polyhydroxyl compounds containing from 2 to 8 (preferably 2 or 3) hydroxyl groups per molecule and having a molecular weight (average) of up to 5000 (preferably up to 2500). Both low molecular weight polyhydroxyl compounds having molecular weights of from 32 to 349 and relatively high molecular weight polyhydroxyl compounds having average molecular weights of at least 350 (preferably at least 1000), such as those described in detail in the above-mentioned publications, may be used.

Relatively high molecular weight polyhydroxyl compounds include the hydroxypolyesters, hydroxypolyethers, hydroxypolythioethers, hydroxypolyacetals, hydroxypolycarbonates, and/or hydroxypolyester amides known in polyurethane chemistry, preferably those having average molecular weights of from 600 to 4000 and most preferably those with average molecular weights of from 800 to 2500. Polycarbonate polyols, polyether polyols, and polyester polyols, as well as polyether carbonate polyols, polyether ester polyols, and polyester carbonate polyols, and mixtures thereof are particularly preferred.

Components suitable for use in the synthesis of the polyurethanes (A) for introducing polyethylene oxide units include homopolyethylene glycols and ethylene oxide copolyethers (preferably ethylene oxide/propylene oxide mixed ethers) containing hydroxyl end groups and having a block or random distribution, provided that the ethylene oxide sequences satisfy the requirements according to the invention. Among these, polyether carbonates and polyether esters based on the above-mentioned homopolyethylene glycols, ethylene oxide copolyethers or mixtures thereof with other polycarbonate-forming or polyester-forming polyhydroxyl compounds are preferred. If copolyethers or polyether carbonates or polyether esters based on such copolyethers are used as components for introducing the polyethylene oxide units into the polyurethane (A) or its precursors, only those units which have the sequence lengths as claimed herein count as polyethylene oxide sequences within the meaning of the invention, while those polyethylene oxide sequences which have a sequence length above or below the limits claimed are not included.

The optimum quantity of polyethylene oxide units in polyurethane (A) depends to some extent on the sequence length and follows the rule that if the sequence length is short the quantity may be slightly greater and if the sequence length is great the quantity may be slightly smaller. Thus with a sequence length of 2, the quantity of these polyethylene oxide units in polyurethane (A) may be up to 50% by weight, whereas if the sequence length is above 20, it is advisable to limit the quantity of these polyethylene oxide units in polyurethane (A) to 20% by weight.

Monofunctional polyethylene oxide alcohols (i.e., ethoxylated monohydric alcohols or ethoxylated phenols) may be incorporated into polyurethane (A) in quantities of from 0.2 to 5% by weight, based on polyurethane (A), for assisting the dispersing action. If such monofunctional polyethylene oxide alcohols are incorporated into polyurethane (A), the proportion of ionic groups may be reduced but these monofunctional units make hardly any contribution to the permeability of the coatings to water vapor. The proportion of such monofunctional polyethylene oxide units in polyurethane (A), based on the total quantity of polyethylene oxide units incorporated, should not exceed 30% by weight and is preferably not more than 20% by weight (more preferably not more than 10% by weight). Best results are obtained when no monofunctional polyethylene oxide units are incorporated.

Starting components which supply the polyethylene oxide units for polyurethane (A) thus include mainly ethylene oxide polyethers and ethylene oxide/propylene oxide mixed polyethers having 2 or 3 hydroxyl groups. Pure ethylene oxide polyethers are particularly preferred. Even when using mixed polyethers, it is generally preferred to use polyethers containing an amount by weight of ethylene oxide units at least equal to the amount of propylene oxide units.

The term "average molecular weights" in the context of this invention denotes molecular weights determined as number average molecular weights.

Compounds that are used in addition to the components supplying the polyethylene oxide units defined in the claims may be selected from the isocyanate-reactive compounds conventionally used in polyurethane chemistry.

Polyhydroxyl components that are suitable as starting materials for polyurethanes but which do not contain the polyethylene oxide units according to the invention are described below.

Suitable hydroxyl group-containing polycarbonates are obtainable by the reaction of carbonic acid derivatives such as diphenyl carbonate or phosgene with diols. Suitable diols for this purpose include ethylene glycol, 1,2- and 1,3-propanediol, 1,4- and 1,3-butanediol, 1,6-hexanediol, 1,8-octanediol, neopentyl glycol, 1,4-bis(hydroxymethyl) cyclohexane, 2-methyl-1,3-propanediol, 2,2,4-trimethyl-1,3-pentanediol, dipropylene glycol, polypropylene glycol, dibutylene glycol, polybutylene glycol, bisphenol A, and tetrabromobisphenol A. The diol component preferably contains from 40 to 100% by weight of hexanediol, preferably 1,6-hexanediol, and/or hexanediol derivatives, preferably those containing ether or ester groups in addition to OH end groups, for example, products obtained by the reaction of 1 mol of hexanediol with at least 1 mol (preferably 1 to 2 mol) of caprolactone according to the method of German Auslegeschrift 1,770,245 or by the autoetherification of hexanediol to form di- or trihexylene glycol. The preparation of such derivatives has been disclosed, for example, in German Auslegeschrift 1,570,540. The polyether-polycarbonate diols described in German Offenlegungsschrift 3,717,060 are also very suitable.

The hydroxyl polycarbonates should be mainly linear but may, if desired, be slightly branched by the incorporation of polyfunctional components, in particular low molecular weight polyols. Glycerol, trimethylolpropane, 1,2,6-hexanetriol, 1,2,4-butanetriol, trimethylolpropane, pentaerythritol, quinitol, mannitol and sorbitol, methyl glycoside, and 1,4,3,6-dianhydrohexitols, for example, are suitable for this purpose.

Suitable polyether polyols other than those described above include the polyethers known in polyurethane chemistry, for example, the addition or mixed addition compounds of tetrahydrofuran, styrene oxide, propylene oxide, the butylene oxides, or epichlorohydrin obtained by reaction with divalent starter molecules such as water, the above-mentioned diols, or amines containing two NH bonds, in particular the addition or mixed addition compounds of propylene oxide.

Examples of suitable polyester polyols include the reaction products of polyvalent (preferably divalent) alcohols, optionally together with trivalent alcohols, with polybasic (preferably dibasic) carboxylic acids. Instead of using free polycarboxylic acids, the corresponding polycarboxylic acid anhydrides or corresponding polycarboxylic acid esters of lower alcohols or mixtures thereof may be used for the preparation of the polyesters. The polycarboxylic acids may be aliphatic, cycloaliphatic, aromatic, and/or heterocyclic and may be substituted (e.g., by halogen atoms) and/or unsaturated. Examples of suitable polycarboxylic acids and derivatives thereof include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, terephthalic acid dimethyl ester and terephthalic acid bis-glycol ester. Examples of suitable polyhydric alcohols include ethylene glycol, 1,2- and 1,3-propanediol, 1,4-and 2,3-butanediol, 1,6-hexanediol, 1,8-octanediol, neopentyl glycol, cyclohexanedimethanol, 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol and sorbitol, methylglycoside, diethylene glycol, triethylene glycol, tetraethylene glycol, dipropylene glycol, dibutylene glycol, and polybutylene glycols. Polyester polyols are generally not used alone in component (II) unless they contain polyethylene oxide —(CH$_2$CH$_2$O)$_n$— units having a sequence length n of from 2 to 50 (as described above) or are used in combination with other types of polyols.

Mixtures of the above mentioned polyether polyols with polycarbonate polyols and/or polyester polyols having average molecular weights of from 1000 to 3000 and obtained from adipic acid, 1,6-hexanediol, and neopentyl glycol are particularly preferred.

Further starting components for the preparation of polyurethanes (A) are in particular chain lengthening agents having molecular weights of from 32 to 299 and containing 1,4-hydroxyl and/or amino groups.

Low molecular weight polyhydroxyl compounds ("chain lengthening agents") include a wide variety of diols such as, for example:

a) Alkane diols such as ethylene glycol, 1,2- and 1,3-propanediol, 1,4-butanediol, 1,5-pentanediol, dimethyl-1,3-propanediol, and 1,6-hexanediol;

b) Ether diols such as diethylene glycol, triethylene glycol, or hydroquinone dihydroxyethyl ether;

c) Ester diols corresponding to the following general formulas:

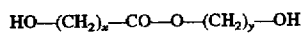

HO—(CH$_2$)$_x$—CO—O—(CH$_2$)$_y$—OH and

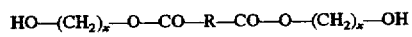

HO—(CH$_2$)$_x$—O—CO—R—CO—O—(CH$_2$)$_x$—OH wherein

R denotes an alkylene or arylene group having 1 to 10 (preferably 2 to 6) carbon atoms, x is from 2 to 6, and y is from 3 to 5.

for example, δ-hydroxybutyl-ε-hydroxycaproic acid ester, ω-hydroxyhexyl-γ-hydroxybutyric acid ester, adipic acid β-hydroxyethyl ester, and terephthalic acid bis(β-hydroxyethyl) ester.

Polyamines may also be used as chain lengthening agents and are preferably aliphatic or cycloaliphatic diamines, although trifunctional or higher functional polyamines may also be included for producing a particular degree of branching. Examples of suitable aliphatic polyamines include ethylenediamine, 1,2- and 1,3-propylenediamine, 1,4-tetramethylenediamine, 1,6-hexamethylenediamine, the isomeric mixture of 2,2,4- and 2,4,4-trimethylhexamethylenediamine, 2-methylpentamethylenediamine, and bis(β-aminoethyl)amine (diethylenetriamine).

Suitable cycloaliphatic polyamines include

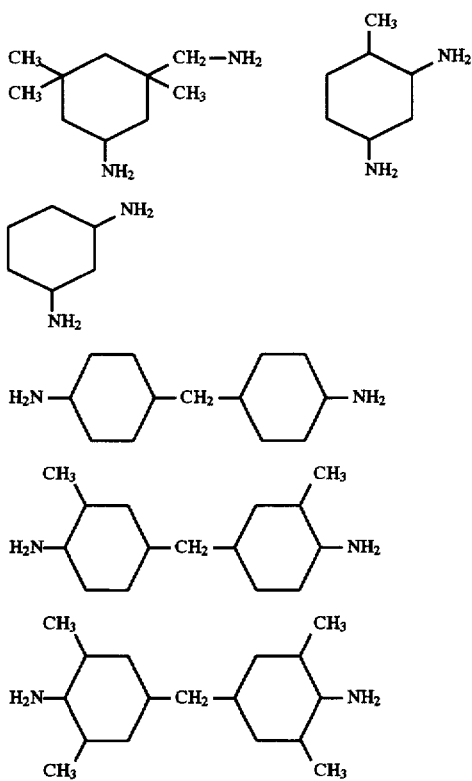

Araliphatic polyamines such as 1,3- and 1,4-xylylenediamine or α,α,α',α'-tetramethyl-1,3- and -1,4-xylylenediamine may also be used as chain lengthening agents for the preparation of polyurethanes (A).

Hydrazine, hydrazine hydrate, and substituted hydrazines are also to be regarded as diamines for the purpose of this invention. Examples include methyl hydrazine, N,N'-dimethyl hydrazine and their homologs, and acid dihydrazides, such as carbodihydrazide, oxalic acid dihydrazide, the dihydrazides of malonic acid, succinic acid, glutaric acid, adipic acid, β-methyladipic acid, sebacic acid, hydracrylic acid and terephthalic acid, semicarbazido-alkylene hydrazides such as β-semicarbazidopropionic acid hydrazide (German Offenlegungsschrift 1,770,591), semicarbazido alkylene carbazic esters such as 2-semicarbazidoethyl carbazic ester (German Offenlegungsschrift 1,918,504), or aminosemicarbazide compounds such as β-aminomethylsemicarbazido carbonate (German Offenlegungsschrift 1,902,931).

Ionic groups for the polyurethanes (A) include alkali metal and ammonium carboxylate and sulfonate groups and ammonium groups. Suitable components for introducing these ionic groups into the polyurethanes (A) include dihydroxycarboxylic acids, diaminocarboxylic acids, dihydroxysulfonic acids, and diaminoalkylsulfonic acids and their salts, for example, dimethylolpropionic acid, ethylenediamino-β-ethylsulfonic acid, ethylenediaminopropyl- or -butyl-sulfonic acid, 1,2- or 1,3-propylenediamine-β-ethylsulfonic acid, lysine, 3,5-diaminobenzoic acid, and their alkali metal and/or ammonium salts, as well as the adduct of sodium bisulfite with 2-butene-1,4-diol.

The preferred components used for introducing the ionic groups into polyurethanes (A) include, in particular, the aliphatic diols containing sulfonate groups according to German Offenlegungsschrift 2,446,440 that correspond to the following formula

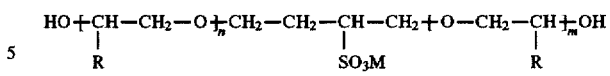

wherein
R denotes hydrogen or an organic group having 1 to 8 carbon atoms,
m and n independently represent the numbers 1 to 10, and
M denotes ammonium or the cation of an alkali metal.

It is also possible, although generally less preferred, to introduce the ionic groups into polyurethanes (A) using other aliphatic diols containing sulfonate groups that correspond to the following formula

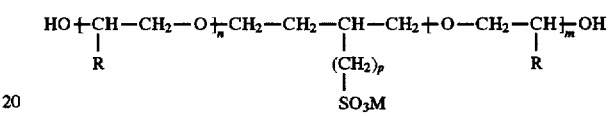

wherein R, M, m, and n are defined as above and p represents 1 or 2.

Examples of cationic or potentially cationic starting components include diols having tertiary amino groups, such as N-methyl-diethanolamine and its protonation or alkylation products.

The components used for introducing the ionic groups into polyurethanes (A) may in general be cationic and/or anionic hydrophilic difunctional starting components of the type described for the preparation of aqueous polyurethane dispersions, such as, for example, dihydroxyl compounds, diamines, or diisocyanates containing ionic or potentially ionic groups.

The aqueous phase (B) consists for the most part of water but may also contain organic auxiliary solvents. Preferred organic auxiliary solvents include, for example, amides such as N,N-dimethylformamide, N,N-dimethylacetamide, and N-methylpyrrolidone; ketones such as methyl ethyl ketone, diacetone alcohol, and cyclohexanone; ethers such as ethylene glycol monomethyl-, monoethyl-, and monobutyl ethers and the corresponding ethers of diethylene glycol, and propylene glycol monomethyl- and monobutyl ether; and esters such as propylene glycol diacetate and dipropylene glycol methyl ether acetate. The quantity of organic auxiliary solvents is preferably up to 20% by weight (preferably up to 10% by weight), based on the total amount of aqueous phase (B).

Polyurethane (A) which is obtained as a solvent-free melt or in the form of a solution after its preparation may then be converted into an aqueous dispersion by mixing with water and optionally thereafter distilling off any auxiliary solvent.

Polyurethanes (A) may in principle be converted into aqueous dispersions by any known process, for example, by dispersion without the aid of solubilizing agents, for example, by mixing the solvent-free polyurethane with water in apparatus capable of producing high shearing gradients, by using very small quantities of organic solvents for plasticizing the polyurethanes in the same apparatus, or by using non-mechanical dispersing agents such as extremely high frequency sound waves. On the other hand, simple mixing apparatus, such as stirrer vessels or so-called throughflow mixers, may be used since polyurethane (A) is self-dispersible.

The dispersions may be mixed with other anionic or non-ionic dispersions, for example, with polyvinyl acetate or with polyethylene, polystyrene, polybutadiene, polyvinyl chloride, polyacrylate, or copolymer dispersions. Known emulsifiers that are not chemically fixed, preferably ionic emulsifiers of this type, may also be added but are, of course, not necessary.

Fillers, plasticizers, pigments, carbon black and silica sols, and dispersions of aluminum, clay, or asbestos may also be incorporated in the dispersion.

Certain properties of the coatings prepared according to the invention, such as the handle or the surface smoothness, may be modified by means of oligomeric compounds with molecular weights of from 300 to 6000 (preferably from 500 to 1500) containing polysiloxane segments and having at least two isocyanate reactive groups. Difunctional polysiloxanes containing organofunctional end groups are preferably used. Such compounds have structural units of the formula —O—Si(R)$_2$— wherein R represents a $C_1$-$C_4$ alkyl group or a phenyl group (preferably a methyl group).

The aqueous coating compositions according to the invention are stable and suitable for storage and transport and may be worked up at any later time. The properties of coatings obtained can be varied according to the selected chemical composition and the urethane group content. Thus, soft, sticky layers and thermoplastic or rubbery elastic products with various degrees of hardness up to glass-hard duroplasts may be obtained. The hydrophilic character of the products may also vary within certain limits. The elastic products may be thermoplastically processed at elevated temperatures, for example, at from 100° to 180° C., provided they are not chemically cross-linked.

The coating compositions according to the invention are suitable for coating or dressing and impregnating woven and non-woven textiles, leather, paper, hard fibers, straw, and paper-type materials. For this purpose, the dispersions or pastes are preferably applied to a porous support which subsequently remains bonded to the finished product, for example, woven or non-woven textiles or fiber mats, felts or non-woven webs or paper webs, foam sheets, or split leather, which bring about instant solidification of the coating due to the suction effect of such substrates. The resultant product is subsequently dried at elevated temperature and optionally pressed. Drying may also be carried out on smooth, porous, or non-porous materials, such as metal, glass, paper, cardboard, ceramic materials, steel sheeting, silicone rubber, or aluminum foils. The finished sheet structure is subsequently lifted off and used as such or applied to a substrate by the reversal process entailing gluing, flame backing, or calendering. Application by the reversal process may be carried out at any time.

The coating composition may be applied to the substrate by direct spread coating using coating knives, rollers, or wire coaters. It is customary to apply several coats in succession, preferably in two coats, so that the total thickness of the coating composed of undercoat and top coat(s) amounts to 10 to 100 µm (preferably 20 to 60 µm).

The undercoat may also be a paste which dries to form a microporous layer, as described in German Offenlegungsschrift 2,020,153.

The top coat that is subsequently applied protects the entire combination of layers against mechanical stress and abrasion.

Application of the coating combination composed of undercoat and top coat may also be carried out by the so-called reversal process, in which the top coat is first applied to a separating support and dried, and, after application of a second undercoat or bonding coat, the textile substrate is lightly pressed into the still moist layer. After drying, a firmly bonded combination of coating and substrate is obtained. This bonded combination is detached from the separating support and is substantially similar in its structure to the direct coating product described above.

The coating compositions according to the invention give rise to coatings in which the permeability to water vapor has surprisingly little dependence upon the thickness of the layer over a wide range of layer thicknesses. The coatings do not swell noticeably in water.

The coatings, which are exceptionally permeable to water vapor and absolutely resistant to drops, may also be prepared from aqueous dispersions containing pigments and/or dyes. Hydrophobicizing agents such as fluorocarbon resins, waxes, and oils may also be added, provided they do not unduly impair the permeability to water vapor. Crosslinking additives that undergo a reaction on their own or with polyurethane (A) only in the finished coating, generally by the action of heat, may also be used. Examples of such compounds include (partially) etherified melamine formaldehyde resins (e.g., hexamethylol melamine) and polyisocyanates that are optionally blocked and have 3 or more isocyanate groups (e.g., based on tris(isocyanatohexyl) isocyanurate and tris(isocyanatohexyl)biuret).

The invention further relates to the use of the coating compositions according to the invention for the preparation of water vapor permeable coatings, in particular, on flexible substrates, such as textiles, leather, paper, and the like.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Starting materials used in the Examples:

| | |
|---|---|
| Diol I: | Polycarbonate of 1,6-hexanediol and tetraethylene glycol (molar ratio 1:1), OH number 56, molecular weight 2000, ethylene oxide ("EOX") content 49% |
| Diol II: | Polycarbonate of 1,6-hexanediol and tetraethylene glycol (molar ratio 2:5), OH number 82, molecular weight 1370, EOX content 65% |
| EOX polyether III: | Monofuctional polyethylene glycol, OH weight 2250 |
| Diol sulfonate IV: | Product of addition of NaHSO$_3$ to propoxylated butene-1,4-diol, OH number approximately 260, molecular weight 425 |
| Diaminosulfonate V: | H$_2$N—CH$_2$CH$_2$—NH—CH$_2$CH$_2$—SO$_3$Na |

Methods of measurement

The permeability to water vapor ("WVP") was determined by the general method of DS 2109 TM1 of British Textile Technology Group, Manchester, England. A double thickness of capillary matting was saturated with distilled water and placed in a chamber having a constant temperature of 20° C. (±1° C.) and a relative humidity of about 65%. About 15 g of dry silica gel in the form of beads having a diameter of about 3 to 5 mm were placed in a plastic cup having an internal diameter at the opening of 61 mm, and the cup and its content were accurately weighed ($W_1$). Test films, each of which had a thickness corresponding to about 50 to about 75 g/m$^2$ (generally 50 to 60 g/m$^2$), were attached firmly over the opening of the plastic cup with a clamping ring and inverted onto the water-soaked capillary matting, which provides a relative humidity at the film surface of 100%. After an accurately timed interval of about one hour, the cup was removed from the wet capillary matting, the clamping ring and test film were removed from the cup (with care being taken to assure that no silica gel beads adhered to the film or were otherwise lost from the cup), and the cup and its content were again accurately weighed ($W_2$). The water vapor permeability in g/m² per day was calculated from the experimentally determined values $W_1$ and $W_2$ (each in grams) using the formula WVP=[($W_2$−$W_1$)×24]/(a×t), where t is the time in hours between successive weighings and a is the area in m² of the exposed test film (calculated using the formula a=πd²/4, where d is the internal diameter of the opening in the cup). For the test cups used in the examples, the formula reduced to WVP=($W_2$−$W_1$)×8216. The values for water vapor permeability were relatively insensitive to film thickness within the range of test thicknesses used in the following examples.

The water resistance ("WR"), or resistance to penetration by liquid water, was determined according to DIN 53,886.

The resistance to drops was determined by subjecting the upper surface of the coating to the action of water drops (1 minute). If no pustular changes occur on the surface, the coating is described as "absolutely drop resistant".

Example 1

Preparation of an aromatic polyurethane dispersion for water-vapor permeable layers.

| Formulation: | |
|---|---|
| 247.2 g | diol I |
| 15.2 g | EOX polyether III |
| 18.0 g | diol sulfonate IV |
| 200.0 g | acetone |
| 84.6 g | 4,4'-diphenylmethane diisocyanate |
| 17.0 g | hexane-1,6-diisocyanate |
| 18.0 g | acetone azine |
| 600.0 g | deionized water |

387 g of solid substance contained 10.9 meq of SO$_3$Na/100 g and 31.3% by weight of EOX in the main chain.

Method:

The acetone and mixture of the two diisocyanates were stirred into the mixture of components I, III, and IV that had been dehydrated at 120° C., and the mixture was left to react under reflux until the isocyanate value was constant. After the temperature dropped to 40° C., the acetone azine was stirred into the isocyanate prepolymer solution. The water was then introduced with vigorous stirring, the resulting dispersion was stirred for a further 2 hours, and the acetone was distilled off.

A film weighing 68 g/m² was prepared to determine the permeability to water vapor (WVP). For this purpose, 100 g of the dispersion were adjusted to a suitable viscosity for spread coating using 1% of a polyacrylic acid thickener after adjustment of the pH to 8 with concentrated ammonia. The water vapor permeability was 15,700 g/m²d.

A film weighing 56 g/m² prepared for comparison from a polyurethane dispersion that had been prepared from a formulation containing a polycarbonate of 1,6-hexanediol with molecular weight 2000 instead of diol I but which otherwise had the same composition had a permeability to water vapor of only 800 g/m²d. The solid substance contained 10.9 meq SO$_3$Na/100 g and 0% EOX in the main chain.

Example 2

Preparation of an aliphatic polyurethane dispersion for water-vapor permeable layers.

| Formulation: |
|---|
| 129.7 g polycarbonate from 1,6-hexanediol, OH number 56, molecular weight 2000 |
| 114.0 g diol I |
| 82.6 g dihydroxypolypropylene glycol, OH number 56, molecular weight 2000 |
| 5.0 g dimethylolpropionic acid |
| 59.5 g hexane 1,6-diisocyanate |
| 2.2 g ethylenediamine |
| 1.4 g hydrazine hydrate |
| 5.6 g diaminosulfonate V |
| 700.0 g acetone |
| 600.0 g water |

400 g of solid substance contained 7.4 meq SO$_3$Na/100 g and 14% by weight EOX in the main chain.

Method:

Polycarbonate, diol 1, and dihydroxypolypropylene glycol were dehydrated under vacuum at 105° C. for 1 hour. Dimethylolpropionic acid was added at 100° C. and hexanediisocyanate was added at 80° C. After 3 hours at 95° C., the resultant prepolymer was dissolved in acetone. The mixture of chain lengthening agents comprising ethylenediamine, hydrazine hydrate, and diaminosulfonate V dissolved in 120 g of water was added dropwise at 50° C. The remaining quantity (480 g) of water was then stirred in. After continuous stirring for 2½ hours at 40° C., the acetone was removed by distillation. A stable 40% dispersion was obtained.

To determine the permeability to water vapor, a film weighing 53 g/m² was prepared after thickening as in Example 1. The water vapor permeability was 9500 g/m²d.

A comparison film prepared from a polyurethane dispersion which instead of containing diol I contained a larger quantity, corresponding to the molar quantity, of a polycarbonate of 1,6-hexanediol having a molecular weight of 2000 but which otherwise had the same composition and had a permeability to water vapor of only 900 g/m²d in a film having a thickness corresponding to 58 g/m². The solid substance contained 7.4 meq SO$_3$Na/100 g and 0% EOX in the main chain.

Transfer coating:

The dispersion described in Example 1 together with a polyacrylic acid thickener was applied to a commercial separating paper (Transcote® VEM CIS of S. D. Warren Company) by means of a roller applicator with built-in coating knife so that a film of 25 g/m² was obtained after drying at 80° to 150° C.

| Spread coating paste: |
|---|
| 100 parts 40% polyurethane dispersion from Example 1 |
| 1 part polyacrylic acid thickener |
| 5 parts aqueous pigment preparation adjusted to pH 8 with ammonia |

A spread coating paste prepared analogously from the polyurethane dispersion of Example 2 (without pigment preparation) was applied as bonding layer to the dried film. After lamination of a cotton fabric weighing about 140 g/m² and drying of the whole arrangement of layers at 80° to 140° C., the water-vapor permeable article obtained had a total weight of 200 g/m² and the coating composed of top coat and bonding coat weighed 60 g/m².

The soft article, which has a pleasant handle, has a water vapor permeability of 6600 g/m²d and a water resistance of 2000 mm.

A transfer article of analogous structure prepared from the comparison dispersions described in Examples 1 and 2 without diol I has a water vapor permeability of 750 g/m²d in a coating weighing 60 g/m².

Example 3

Preparation of an aliphatic polyurethane dispersion for water vapor permeable layers.

| Formulation: |
|---|
| 245.5 g diol I |
| 75.5 g dihydroxypolypropylene glycol, OH number 56, molecular weight 2000 |
| 12.7 g EOX polyether III |
| 3.1 g neopentyl glycol |
| 54.0 g hexane-1,6-diisocyanate |
| 2.3 g ethylenediamine |
| 1.4 g hydrazine hydrate |
| 4.7 g diaminosulfonate V |
| 700.0 g acetone |
| 600.0 g water |

400 g solid substance contained 6.2 meq SO₃Na/100 g and 30.0% by weight EOX in the main chain.

Method:

A 40% dispersion was prepared analogously to Example 2. To determine the permeability to water vapor, the dispersion was thickened as in Example 1 and a film weighing 57 g/m² was produced. The water vapor permeability was 3600 g/m²d.

A comparison film produced from a polyurethane dispersion which instead of containing diol I contained a polycarbonate of 1,6-hexanediol of molecular weight 2000 but was otherwise identical in composition had a water vapor permeability of only 750 g/m²d when the film thickness was 59 g/m².

Transfer coating:

A spread coating paste prepared from the dispersion of Example 3 was applied as bonding layer to the top coat described in Example 2 using a method analogous to that described in Example 2, and the layers were laminated at 140° C. with the cotton fabric also described in Example 2. The coating composition composed of top coat and bonding coat weighed 60 g/m². The water vapor permeability of the article was 6300 g/m²d and a 2000 mm water resistance.

Example 4

Preparation of an aliphatic polyurethane dispersion for water vapor permeable layers.

| Formulation: |
|---|
| 131.4 g polycarbonate of 1,6-hexanediol, OH number 56, molecular weight 2000 |
| 116.8 g diol I |
| 19.7 g EOX polyether III |
| 6.2 g dimethylolpropionic acid |
| 10.5 g 1,4-butanediol |
| 44.2 g hexane-1,6-diisocyanate |

| -continued |
|---|
| Formulation: |
| 58.3 g isophorone diisocyanate |
| 3.5 g ethylenediamine |
| 2.2 g hydrazine hydrate |
| 7.2 g diaminosulfonate V |
| 700.0 g acetone |
| 600.0 g water |

400 g solid substance contained 9.5 meq SO₃Na and 14.3% by EOX in the main chain.

Method:

A 40% polyurethane dispersion was prepared from these components analogously to Example 2 by the acetone process.

To determine the permeability to water vapor, a film weighing 52 g/m² was prepared after thickening of the dispersion with 3.0 g of a 30% solution of poly-N-vinylpyrrolidone. The water vapor permeability was 11,300 g/m²d.

A comparison film from a polyurethane dispersion analogous to that of Example 4 in which diol I had been replaced by the equimolar quantity of hexanediol polycarbonate had a water vapor permeability of 1500 g/m²d in a film weighing 48 g/m². The solid substance contained 9.5 meq SO₃Na and 0% EOX in the main chain.

Transfer coating:

The polyurethane dispersion which had been thickened with poly-N-vinylpyrrolidone as described above was used for producing a top coat as in Example 2 after it had been pigmented. The spread coating paste described in Example 3 was used as bonding coat. The textile substrate used was a mixed fabric of cotton/polyester weighing 100 g/m². The coating composed of top coat and bonding coat weighed 53 g/m². The water vapor permeability was 6900 g/m²d. When the bonding coat paste was used as a so-called beaten foam dispersion, unit weight 500 g/l, the water vapor permeability was 7500 g/m²d when the total layer weighed 55 g/m² and the water resistance was 2000 mm.

When the comparison dispersion mentioned in Example 4 was used as top coat and the comparison dispersion mentioned in Example 3 was used as bonding coat, the water vapor permeability values were 900 g/m²d (compact) and 1150 g/m²d (foamed).

Example 5

Preparation of an aliphatic polyurethane dispersion for water vapor permeable layers.

| Formulation: |
|---|
| 74.3 g 1,6-hexanediol polyadipate, OH number 133, molecular weight 840 |
| 132.2 g diol II |
| 27.3 g diol sulfonate IV |
| 6.5 g trimethylolpropane |
| 33.8 g N-methylpyrrolidone |
| 118.0 g dicyclohexylmethane-4,4'-diisocyanate |
| 21.5 g hexane-1,6-diisocyanate |
| 20.2 g acetone azine |
| 545.0 g deionized water |

386 g of solid substance contained 16.7 meq SO₃Na/100 g and 22.3% by weight EOX in the main chain.

Method:

Trimethylolpropane, N-methylpyrrolidone, and the two isocyanates were stirred at 70° C. into the mixture of polyester and components II and IV, which had been dehydrated at 100° C. The mixture was allowed to react at 80° C. until the NCO value was constant. After cooling to 75° C., the acetone azine was stirred into the isocyanate prepolymer melt. The water was then introduced with vigorous stirring and the resultant dispersion continued to be stirred for a further 3 hours. The polyurethane dispersion was adjusted to a spread coating viscosity (8000 mPa.s/25° C.) with a polyacrylic acid thickener at pH 8 as in Example 1. The film weighing 56 g/m² thus produced had a water vapor permeability of 13,800 g/m²d.

The comparison film obtained from a polyurethane dispersion analogous to that of Example 5 but with the diol II content replaced by the equimolar quantity of hexanediol polyadipate had a water vapor permeability of only 400 g/m² in a film weighing 52 g/m². The solid substance (1040 g) contained 19.2 meq $SO_3Na/100$ g and 0% by weight EOX in the main chain.

Transfer coating:

The dispersions described in Examples 2 and 5 were applied to a commercial separating paper (Transcote® VEM CIS of S. D. Warren Company) in a ratio by weight of 1:1 together with a polyacrylic acid thickener, using a roller coating device with coating knife cut in, to produce a film which weighed 25 g/m² after drying at 80° to 150° C.

| Spread coating paste: |
| --- |
| 50 parts 40% polyurethane dispersion of Example 2 |
| 50 parts 40% polyurethane dispersion of Example 5 |
| 1 part polyacrylic acid thickener |
| 5 parts aqueous pigment preparation adjusted to pH 8 with ammonia |

A spread coating paste prepared analogously from the polyurethane dispersion of Example 2 (without pigment preparation) was applied as bonding layer to the dried film. After lamination with a cotton fabric weighing about 140 g/m² and drying of the whole arrangement of layers at 80° to 140° C., the water vapor permeable article obtained had a total weight of 200 g/m² with the coatings (top coat and bonding coat) weighing 60 g/m².

The article, which was soft and pleasant to handle, had a permeability to water vapor of 10,600 g/m²d and a water resistance of 2000 mm.

When the amount of coating was varied from 50 g/m² to 75 g/m², the permeabilities to water vapor were equally high with water resistance values of 2000 mm.

A transfer article produced from the comparison dispersions described in Examples 2 and 5 but without diol I or diol II and analogous in structure had a water vapor permeability of 1750 g/m² in a coating weighing 60 g/m².

A further increase in permeability to water vapor can be obtained by using a foamed bonding coat instead of the compact bonding coat of Example 2.

A spread coating foam paste was applied to the dried film of top coat in layers of 40 to 50 g/m².

| Foam spread coating paste (mechanical foaming): |
| --- |
| 100 parts 40% polyurethane dispersion of Example 2 |
| 2.0 parts STOKAL ® SR foamant (Stockhausen) |
| 0.8 parts STOKAL ® STA foam stabilizer (Stockhausen) |
| 1.5 part MIROX ® AM thickener (Stockhausen) |
| X parts ammonia to adjust to pH 8–9 |

Weight per liter: about 500 g/l

After lamination with a cotton fabric weighing about 140 g/m² and drying of the arrangement of coatings at 80° to 140° C., the water vapor permeable article obtained had a total weight of 220 g/m² and the layer composed of top coat and foamed bonding coat weighed 80 g/m².

The soft article, which had a very pleasant handle, had a water-vapor permeability of 13,500 g/m²d and a water resistance of 2000 mm.

When subjected to discrete water droplets, the coatings were absolutely resistant to drops and exhibited hardly any swelling in water.

Example 6

Preparation of an aliphatic polyurethane dispersion for water vapor permeable layers.

| Formulation: |
| --- |
| 258.0 g polyadipate of 1,6-hexanediol/neopentyl glycol (molar ratio 65:35), OH number 66, molecular weight 1700 |
| 69.2 g diol II |
| 60.0 g hexane-1,6-diisocyanate |
| 2.4 g ethylenediamine |
| 10.0 g diaminosulfonate V |
| 70.0 g acetone |
| 600.0 g water |

400 g of solid substance contained 13.1 meq/100 g and 11.2% by weight EOX in the main chain.

Method:

A 40% dispersion was prepared by the acetone process analogously to Example 2. The permeability to water vapor of a film weighing 63 g/m² was 4400 g/m²d.

A film obtained from a dispersion in which the diol II content had been replaced by the equimolar quantity of a polyadipate of 1,6-hexanediol/neopentyl glycol had a water vapor permeability of 800 g/m²d (weight of film 54 g/m²). The solid substance (417 g) contained 12.6 meq/100 g and 0% by weight EOX in the main chain.

Example 7

Preparation of an aliphatic polyurethane dispersion for water vapor permeable layers.

| Formulation: |
| --- |
| 239.0 g diol I |
| 14.7 g EOX polyether III |
| 17.4 g diol sulfonate IV |
| 111.5 g dicyclohexylmethane-4,4'-diisocyanate |
| 17.4 g acetone azine |
| 600.0 g deionized water |

388 g of solid substance contained 10.6 meq $SO_3Na/100$ g and 30.2% by weight EOX in the main chain.

Method:

A 40% dispersion was prepared by the acetone azine process analogously to Example 5.

A film weighing 56 g/m² had a WVP value of 6900 g/m².

A film obtained from a polyurethane dispersion containing, instead of diol I, the equimolar quantity of a polyadipate of 1,6-hexanediol/neopentyl glycol (molar ratio 65:35), molecular weight 2000, and otherwise having the same composition had a water vapor permeability of only 1200 g/m²d in a film weighing 60 g/m². The solid substance (388 g) contained 10.6 meq SO₃Na/100 g and 0% EOX in the main chain.

Example 8

Preparation of an aliphatic polyurethane dispersion for water vapor permeable layers.

| Formulation: |
|---|
| 260.6 g diethylene glycol polyadipate, OH number 45, molecular weight 2500 |
| 66.7 g dihydroxypolypropylene glycol, OH number 56, molecular weight 2000 |
| 11.3 g EOX polyether III |
| 3.6 g dimethylolpropionic acid |
| 50.4 g hexane-1,6-diisocyanate |
| 2.0 g ethylenediamine |
| 1.3 g hydrazine hydrate |
| 4.1 g diaminosulfonate V |
| 700.0 g acetone |
| 600.0 g water |

400 g of solid substance contained 5.4 meq SO₃Na/100 g and 26% by weight EOX in the main chain.

Method:

A 40% dispersion was prepared by the acetone process analogously to Example 2.

A film prepared from the dispersion which had been thickened as in Example 1 had a water vapor permeability of 3600 g/m²d in a film weighing 56 g/m².

When the diethylene glycol polyadipate in this Example was replaced by the equimolar quantity of 1,6-hexanediol polycarbonate (molecular weight 2000), the film produced from this dispersion, weighing 58 g/m², had a permeability to water vapor of 900 g/m²d. The solid substance (348 g) contained 6.2 meq SO₃Na/100 g and 0% EOX in the main chain.

Example 9

Preparation of an aliphatic polyurethane dispersion.

| Formulation: |
|---|
| 131.4 g 1,6-hexanediol polycarbonate, OH number 56, molecular weight 2000 |
| 116.8 g polycarbonate from triethylene glycol, OH number 56, molecular weight 2000 |
| 19.7 g EOX polyether III |
| 6.2 g dimethylolpropionic acid |
| 10.5 g 1,4-butanediol |
| 44.2 g hexane-1,6-diisocyanate |
| 58.3 g isophorone diisocyanate |
| 3.5 g ethylenediamine |
| 2.2 g hydrazine hydrate |
| 7.2 g diaminosulfonate V |

| Formulation: |
|---|
| 750.0 g acetone |
| 600.0 g water |

400 g of solid substance contained 9.5 meq SO₃Na/100 g and 22% by weight EOX in the main chain.

Method:

A 40% dispersion was prepared analogously to Example 2 by the acetone process.

A film produced from a dispersion which had been thickened as in Example 1 and weighed 54 g/m² had a permeability to water vapor of 10,500 g/m²d.

When the polycarbonate of triethylene glycol was replaced by the equimolar quantity of the polycarbonate of 1,6-hexanediol, the film obtained from this dispersion had a water vapor permeability of 1500 g/m²d when the weight was 48 g/m². The solid substance (400 g) contained 9.5 meq SO₃Na/100 g and 0% EOX in the main chain.

Example 10

Preparation of an aliphatic polyurethane dispersion for water vapor permeable layers.

| Formulation: |
|---|
| 60.9 g polycarbonate of 1,6-hexanediol, OH number 56, molecular weight 2000 |
| 207.1 g diol I |
| 6.5 g dimethylolpropionic acid |
| 11.0 g 1,4-butanediol |
| 43.5 g hexane-1,6-diisocyanate |
| 57.5 g isophorone diisocyanate |
| 3.7 g ethylenediamine |
| 3.3 g hydrazine hydrate |
| 7.5 g diaminosulfonate V |
| 700.0 g acetone |
| 600.0 g water |

400 g of solid substance contained 9.9 meq SO₃Na/100 g and 25.4% by weight EOX in the main chain.

Method:

A 40% polyurethane dispersion was prepared from these components by the acetone process as in Example 2.

To determine the permeability to water vapor, a film weighing 52 g/m² was prepared from the dispersion after it had been thickened with 3.0 g of a 30% solution of poly-N-vinylpyrrolidone. The water vapor permeability was 12,300 g/m²d.

A comparison film produced from a polyurethane dispersion analogously to Example 10 without containing diol I but containing the equimolar quantity of the polycarbonate of hexanediol and having otherwise the identical composition had a water vapor permeability of 1500 g/m²d in a film weighing 48 g/m².

Transfer coating:

The polyurethane dispersion which had been thickened with poly-N-vinylpyrrolidone as above was used for producing a top coat after it had been pigmented as in Example 2. The spread coating paste described in Example 2 was used as bonding coat. The textile substrate used was a mixed fabric of cotton/polyester weighing 100 g/m². The coating composed of top coat and bonding coat weighed 53 g/m². The water vapor permeability was 11,100 g/m²d. When the bonding coat paste was used as a so-called beaten foam dispersion with a unit weight of 500 g/l, the water vapor permeability of the whole coating weighing 55 g/m² was 14,500 g/m²d.

The coatings from all the Examples according to the invention were resistant to drops and showed hardly any swelling in water.

When the comparison dispersion mentioned in Example 10 was used as top coat and the comparison dispersion mentioned in Example 2 was used as bonding coat, the water vapor permeability values were 800 g/m²d (compact) and 950 g/m²d (foamed).

Example 11

Preparation of an aliphatic polyurethane dispersion for water vapor permeable layers.

| Formulation: |
| --- |
| 213.8 g tetraethylene glycol phthalic acid polyester, OH number 56, molecular weight 2000, EOX content 54% |
| 150.0 g 1,6-hexanediol phthalic acid polyester, OH number 56, molecular weight 2000 |
| 17.0 g polyether prepared by propoxylation of trimethylolpropane, OH number 385, molecular weight 435 |
| 65.1 g hexane-1,6-diisocyanate |
| 11.1 g isophorone diisocyanate |
| 1.5 g ethylenediamine |
| 16.6 g diaminosulfonate V |
| 650.0 g acetone |
| 710.0 g water |

475 g of solid substance contained 17.8 meq SO₃Na/100 g and 24% by weight EOX in the main chain.

Method:

The two phthalic acid polyesters were dehydrated together with the polyether in an aspirator vacuum at 100° C. After the mixture was cooled to 65° C., the hexane-1,6-diisocyanate and isophorone diisocyanate were added. After the exothermic reaction has subsided, the mixture was stirred for 5 hours at 80° C. until an NCO value of 3.3±0.1% was reached. The mixture was cooled to 65° C. and dissolved in acetone. A mixture of ethylenediamine, diaminosulfonate V, and 210 g of water was added to the acetone solution at 50° C. over a period of about 15 minutes. Immediately thereafter a further 500 g of water was added over a period of 5 minutes to form a dispersion. The acetone was distilled off until an acetone content of less than 1.0% was reached. The resultant dispersion was adjusted with water to a solids content of 40.0%.

To determine the permeability to water vapor, a film weighing 75 g/m² was prepared after thickening the dispersion as in Example 1. The water vapor permeability was 23,700 g/m²d.

A comparison film prepared from a polyurethane dispersion which instead of containing the hydrophilic tetraethylene glycol phthalic acid ester contained a larger quantity, corresponding to the molar quantity, of 1,6-hexanediol phthalic acid ester but which otherwise had the same composition had a water vapor permeability of only 200 g/m²d in a film weighing 54 g/m². The solid substance contained 17.8 meq SO₃Na/100 g and 0% EOX in the main chain.

Direct coating:

The dispersion thickened as in Example 1 was applied to polyester taffeta having a fabric weight of about 60 g/m² by the direct process using an air doctor blade and the coating was dried at 80° to 150° C. The dispersion was applied a second time and also dried to form a coating weighing about 20 g/m².

| Spread coating paste: |
| --- |
| 100 parts 40% polyurethane dispersion |
| 1 part 25% ammonia (adjusted to pH 8–9) |
| 1 part polyacrylic acid thickener |

The spread coating paste described in Example 5 (polyurethane dispersions of Examples 2 and 5) was applied as a finish in a single coating by the direct process using an air doctor blade. After drying at 80° to 150° C., the total coating weight was about 25 g/m². The water vapor permeable article, which was pleasant to handle, had a water vapor permeability of 5100 g/m 2d and a water resistance of 2000 mm.

Example 12

Preparation of a polyurethane dispersion using a polyether diol to introduce the EOX units into the main chain.

| Formulation: |
| --- |
| 237.5 g polycarbonate of 1,6-hexanediol, OH number 56, molecular weight 2000 |
| 72.5 g polyether diol of ethylene oxide and propylene oxide (weight ratio of 1:1), OH number 56, molecular weight 2000 |
| 105 g polyether diol of propylene glycol, OH number 56, molecular weight 2000 |
| 6.4 g dimethylolpropionic acid |
| 75.6 g hexane-1,6-diisocyanate |
| 2.85 g ethylenediamine |
| 1.75 g hydrazine hydrate |
| 7.12 g diaminosulfonate V |
| 825.0 g acetone |
| 1300.0 g water |

508.1 g of solid substance contained 7.4 meq SO₃Na/100 g and 7.1% by weight EOX in the main chain.

Method:

The polycarbonate and the two polyether diols were dehydrated under vacuum at 100° C. Dimethylolpropionic acid was added at 100° C. and hexanediisocyanate was added at 80° C. After 3 hours at 100° C., the resultant prepolymer was dissolved in acetone. The mixture of chain lengthening agents comprising ethylenediamine, hydrazine hydrate, and diaminosulfonate V dissolved in 120 g of water was added at 50° C. The remaining quantity (627 g) of water was then stirred in. After continued stirring for 2½ hours at 40° C., the acetone was removed by distillation. A stable 28% dispersion was obtained. The polyurethane dispersion was thickened as in Example 1. The film weighing 72 g/m² thus produced had a water vapor permeability of 8,800 g/m²d.

Example 13

Preparation of a polyurethane dispersion using a polyether diol to introduce the EOX units into the main chain.

| Formulation: |
| --- |
| 191.5 g polyadipate of 1,6-hexanediol, OH number 133, molecular weight 840 |
| 60.0 g polyether diol of ethylene oxide and propylene oxide (weight |

21

-continued

| Formulation: |
|---|
| ratio of 1:1), OH number 56, molecular weight 2000 |
| 22.5 g diol sulfonate IV |
| 8.0 g trimethylolpropane |
| 34.7 g N-methylpyrrolidone |
| 146.7 g dicyclohexylmethane-4,4'-diisocyanate |
| 26.9 g hexane-1,6-diisocyanate |
| 25.1 g acetone azine |
| 802.0 g deionized water |

462.9 g of solid substance contained 11.4 meq $SO_3Na/100$ g and 6.5% by weight EOX in the main chain.

Method:

A mixture of the polyester, the polyether, and the diol sulfonate were dehydrated under vacuum at 100C, after which was added trimethylolpropane, N-methylpyrrolidone, and the two isocyanates with stirring at 70° C. The mixture was allowed to react at 90° C. until the NCO value was constant. After cooling to 75° C., the acetone azine was stirred into the isocyanate prepolymer melt. The water was then introduced with vigorous stirring and the resultant dispersion was stirred for a further 3 hours. The solids content was 35%. The polyurethane dispersion was thickened as in Example 1. The film weighing 62 g/m² thus produced had a water vapor permeability of 10,800 g/m²d.

Example 14

(comparison according to U.S. Pat. No. 4,108,814)

A polyurethane dispersion was prepared according the Example 1 of U.S. Pat. No. 4,108,814 using the following components:

| |
|---|
| 340 g polyadipate of 1,6-hexanediol and neopentyl glycol, OH number 66, molecular weight 1700 |
| 12.8 g diol sulfonate IV |
| 69.6 g hexane-1,6-diisocyanate |
| 33.8 g diaminosulfonate V (45% aqueous solution) |
| 700.0 g deionized water |

437.6 g of solid substance contained 25.1 meq $SO_3Na/100$ g and 0% by weight EOX in the main chain.

To determine the permeability to water vapor, a film weighing 65 g/m² was prepared after thickening the dispersion as in Example 1. The water vapor permeability was 2200 g/m²d.

What is claimed is:

1. A coating composition used for the preparation of coatings having a water vapor permeability of at least 2500 g/m² per day using the DS 2109 TM1 method comprising (A) a polyurethane containing (1) from 0.1 to 75 meq per 100 g of polyurethane (A) of ionic groups and (2) 11 to 50% by weight, based on polyurethane (A), of polyethylene oxide —$(CH_2CH_2O)_n$— units having a sequence length n of from 2 to 25 incorporated into the main chain, wherein said polyurethane (A) is prepared from reactive components comprising (I) one or more polyisocyanates, (II) one or more polyols having a number average molecular weight of from 350 to 5000, with the proviso that if any such polyol is a sulfonated polyether diol having the formula

22

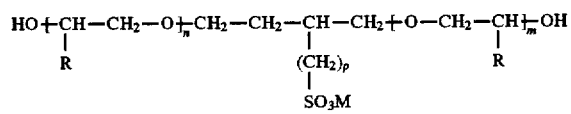

wherein R denotes hydrogen or an organic group having 1 to 8 carbon atoms, m and n independently represent the numbers 1 to 10, p represents the numbers 0, 1, or 2, and M denotes ammonium or the cation of an alkali metal, then at least one additional polyether polyol containing ethoxy groups must also be present, and (III) one or more chain lengthening agents having a molecular weight of from 32 to 349; and (B) from 30 to 80% by weight, based on the sum of components (A) and (B), of an aqueous phase.

2. A coating composition according to claim 1 used for the preparation of coatings having a water vapor permeability of at least 2500 g/m² per day using the DS 2109 TM1 method comprising (A) a polyurethane containing (1) from 0.1 to 75 meq per 100 g of polyurethane (A) of ionic groups selected from the group consisting of (a) alkali metal and ammonium salts of carboxylate groups, (b) alkali metal and ammonium salts of sulfonate groups, (c) ammonium groups, and (d) mixtures thereof, and (2) 11 to 50% by weight, based on polyurethane (A), of polyethylene oxide —$(CH_2CH_2O)_n$— units having a sequence length n of from 2 to 25 incorporated into the main chain, wherein said polyurethane (A) is prepared from reactive components comprising (I) one or more polyisocyanates, (II) one or more polyols having a number average molecular weight of from 350 to 5000, with the proviso that if any such polyol is a sulfonated polyether diol having the formula

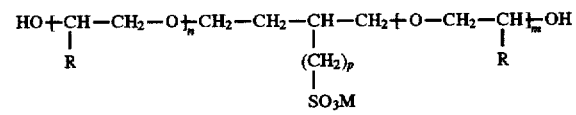

wherein R denotes hydrogen or an organic group having 1 to 8 carbon atoms, m and n independently represent the numbers 1 to 10, p represents 0, 1, or 2, and M denotes ammonium or the cation of an alkali metal, then at least one additional polyether polyol containing ethoxy groups must also be present, and (III) one or more chain lengthening agents having a molecular weight of from 32 to 349; and (B) from 30 to 80% by weight, based on the sum of components (A) and (B), of an aqueous phase.

3. A coating composition according to claim 1 wherein component (II) comprises (a) at least one polyol corresponding to the formula

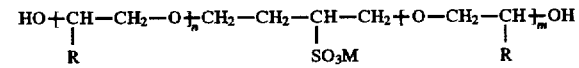

wherein
R denotes hydrogen or an organic group having 1 to 8 carbon atoms,
m and n independently represent the numbers 1 to 10, and
M denotes ammonium or the cation of an alkali metal, and (b) at least one additional polyether polyol containing ethoxy groups present in quantities such that at least 25% of the ethoxy groups incorporated into the main chain of polyurethane (A) are derived from said additional polyol.

4. A coating composition according to claim 1 used for the preparation of coatings having a water vapor permeability of from 2500 to 25,000 g/m² per day using the DS 2109 TM1 method.

5. A coating composition according to claim 1 wherein polyurethane (A) contains from 14 to 40% by weight, based on polyurethane (A), of polyethylene oxide units incorporated into the main chain.

6. A coating composition according to claim 1 wherein polyurethane (A) contains ionic groups in a quantity of from 0.5 to 40 meq per 100 g of polyurethane (A).

7. A coating composition according to claim 1 wherein polyurethane (A) contains from 11 to 35% by weight, based on polyurethane (A), of polyethylene oxide units incorporated into the main chain.

8. A coating composition according to claim 1 wherein the sequence length n of the polyethylene oxide —(CH$_2$CH$_2$O)$_n$— units is from 3 to 12.

9. A coating composition according to claim 1 wherein at least one polyol of component (II) corresponds to the formula

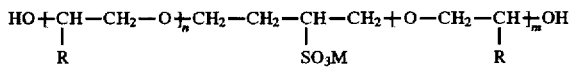

wherein

R denotes hydrogen or an organic group having 1 to 8 carbon atoms, m and n independently represent the numbers 1 to 10, and M denotes ammonium or the cation of an alkali metal, and at least one additional polyether polyol containing ethoxy groups is present.

* * * * *